United States Patent [19]
Nelson et al.

[11] 3,797,641
[45] Mar. 19, 1974

[54] CONTAINER TWISTING STRUCTURE FOR RINSER OR THE LIKE

[75] Inventors: John Nelson, Newington; Robert J. Schultz, Portland, both of Conn.

[73] Assignee: Emhart Corporation, Bloomfield, Conn.

[22] Filed: Sept. 13, 1971

[21] Appl. No.: 179,876

[52] U.S. Cl. .............................. 193/43 A, 24/A S
[51] Int. Cl. ............................................. B65g 11/20
[58] Field of Search........ 198/204, 74 B; 24/73 H S, 24/16 P B, 73 A P, 73 A S; 248/74 A, 74 B; 193/43 A, 43 R; 198/33 AC

[56] References Cited
UNITED STATES PATENTS

| | | | |
|---|---|---|---|
| 1,436,549 | 11/1922 | Tibbits.............................. | 193/43 A |
| 3,154,281 | 10/1964 | Frank ............................... | 24/73 AP |
| 3,461,510 | 8/1969 | Holmes............................. | 24/16 PB |

FOREIGN PATENTS OR APPLICATIONS

| | | | |
|---|---|---|---|
| 788,742 | 1/1958 | Great Britain...................... | 24/73 HS |

Primary Examiner—Evon C. Blunk
Assistant Examiner—H. S. Lane
Attorney, Agent, or Firm—McCormick, Paulding & Huber

[57] ABSTRACT

Containers are fed by line pressure through a plurality of resilient guide rods, which rods are bent to define a helical path for the containers, and novel means is provided for supporting these guide rods at bulkhead stations along this helical path. Each bulkhead has an opening through which the containers can pass, and a series of hexagonal openings provided adjacent the container opening in each bulkhead are adapted to receive soft plastic plugs which can be clamped in these hexagonal openings to support guide rod supporting members each of which is mounted in a predetermined angular relationship with respect to the plane of the bulkhead.

6 Claims, 5 Drawing Figures

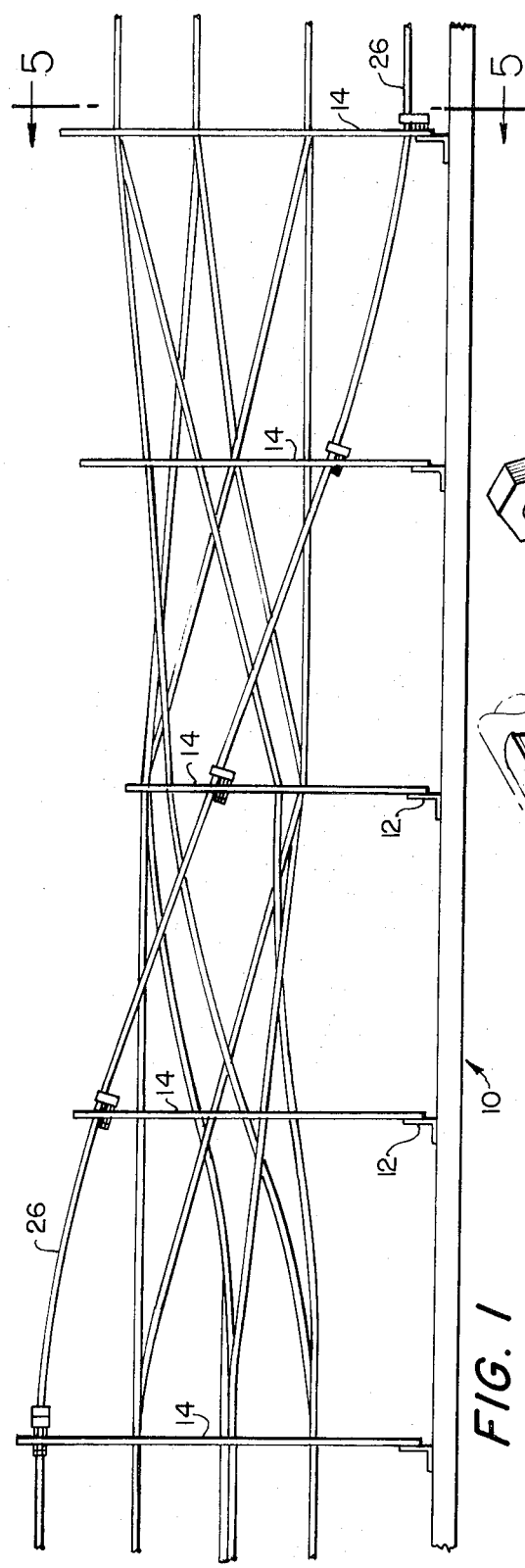
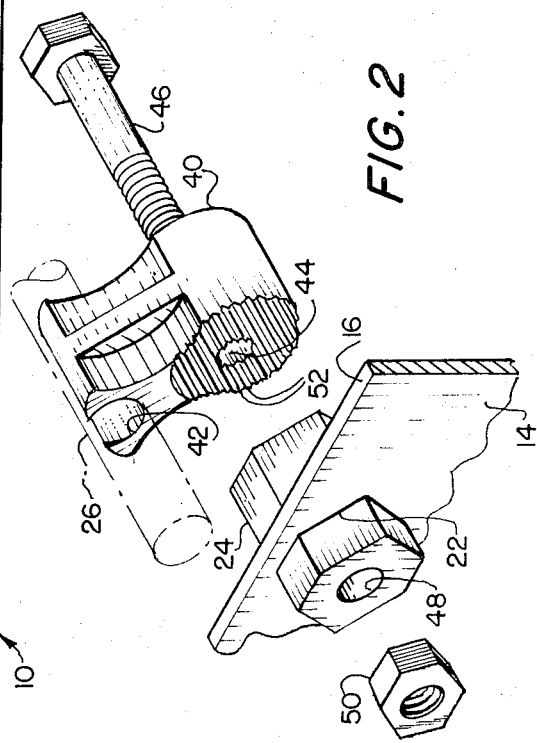

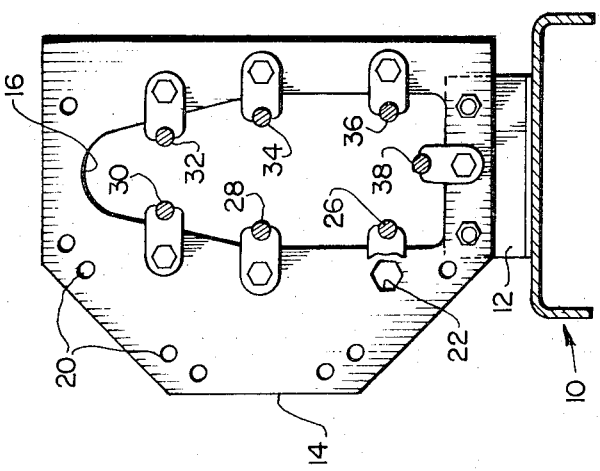
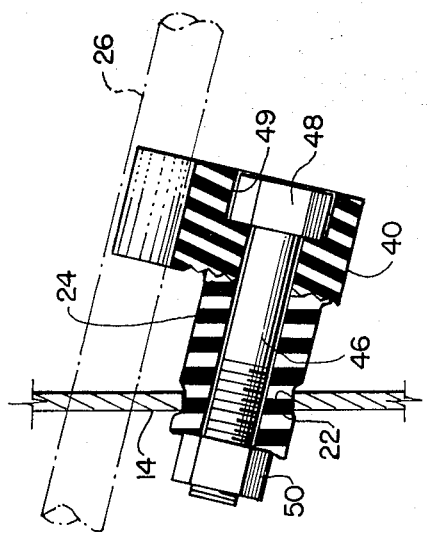
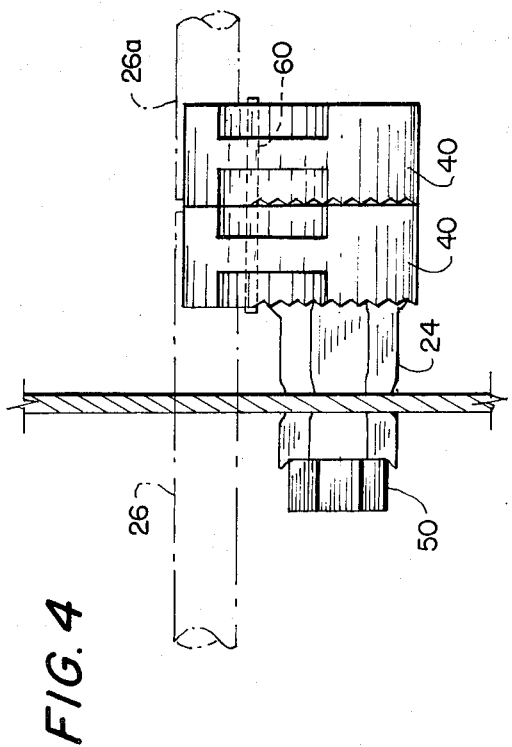

CONTAINER TWISTING STRUCTURE FOR RINSER OR THE LIKE

SUMMARY OF THE INVENTION

This invention relates generally to apparatus for twisting containers as they are fed by line pressure through a rinser or the like, and deals more particularly with the novel supporting structure for the guide rods used in so twisting the containers through a generally helical path from an inverted to an upright position, or from an upright to an inverted position.

Apparatus for twisting containers such as glass bottles or the like are known and the twister shown in U. S. Pat. No. 1,810,511 is representative. The present invention relates to a novel supporting apparatus for the helically twisted guide rods which invert or erect the bottles as they proceed in a generally helical motion through a machine for rinsing such containers or in some cases for drying them. The present invention relates to a novel mounting means for the guide rods used to confine the containers as they are so fed through the twister, and a plurality of these mounting devices are used in a typical twisting structure, one such device being adapted for use for each guide rod at every bulkhead station in the twister. A plurality of parallel bulkheads are supported from a fixed framework, and each bulkhead includes a central opening through which the containers are adapted to pass, each bulkhead being capable of being mounted in one of a plurality of angular positions with respect to the fixed framework to define the container orientation at that point in the twister. Each bulkhead further includes a pattern of non-circular holes around each container opening. Each such hole is preferably in the form of a hexagon for receiving a soft plastic hexagonal plug which comprises a part of the guide rod mounting device. Each such device further includes a rigid member which includes a lateral opening for receiving the guide rod to restrain the guide rod against movement toward and away from the path of movement of the containers. A second opening in each of these rigid guide rod mounting members receives a screw, which screw also passes axially through the hexagonal plug so that its threaded end can receive a nut to permit the hexagonal plug to be clamped axially and thereby expanded radially in an associated one of said non-circular holes for clamping said plug and resiliently supporting a guide rod in the desired angular relationship with respect to the plane of the associated bulkhead. A slightly longer screw can be used together with two of these rigid guide rod mounting members to support two guide rods in end-to-end relationship from a particular bulkhead, and more particularly from a single hexagonal plug clamped in one of said non-circular bulkhead holes.

BRIEF DESCRIPTION OF THE DRAWINGS

FIG. 1 shows in vertical elevation a typical twister configuration representing the environment in which a plurality of the mounting devices embodying the present invention are intended to be used.

FIG. 2 shows in perspective view a mounting device of the present invention in exploded relationship, with a bulkhead also shown and with a guide rod also shown in phantom lines.

FIG. 3 is a sectional view of the mounting device of FIG. 2 in assembled relationship to its associated guide rod and bulkhead.

FIG. 4 is a view similar to FIG. 3 but showing the device as it would be adapted for use in connecting two guide rods in end-to-end relationship.

FIG. 5 is a vertical sectional view taken on the line 5—5 of FIG. 1.

DETAILED DESCRIPTION

In a conventional rinser containers in the form of bottles or the like are adapted to be moved by a conventional conveyor in an upright position into one end of the rinser machine wherein they may be engaged by side belts to then move through the machine under the line pressure of one bottle forcing the bottle ahead through the machine. As the bottles are moved out of the side belts, they are thrust into helically twisted guide rails, or rods, which then invert the bottles by a helical motion. The bottles then move through a substantial portion of the machine while inverted, passing over water and/or air nozzles which force fluid upwardly into the bottles to clean them. Then, as the bottles near the exit end of the machine they are again turned or twisted by a plurality of helically twisted guide rails or rods to return the bottles to their upright positions so they can be moved onto a conventional belt type take-away conveyor. The apparatus to be described relates to the twister portions of the above-described machine for use at either the entrance end, for inverting the containers, or at the exit end, for returning the containers to their upright positions.

Turning now to the drawings in greater detail, FIG. 1 shows a portion of the fixed framework of a machine of the type described above, and said machine frame includes an inverted channel 10 having a plurality of upstanding rib portions 12, 12 stamped from the web of the channel to provide supports for a series of bulkheads 14, 14. The bulkheads 14, 14 are mounted to the upstanding webs 12, 12 of the channel at predetermined longitudinally spaced locations, and each of the bulkheads has a container opening, as indicated generally at 16, in FIG. 5. In the embodiment shown, each of these bulkheads 14 further includes pairs or sets of mounting holes 20, 20, any pair of which can be used to mount the bulkhead 14 to the channel 10, and more particularly to one of said upstanding webs 12 to orient the container opening 16 either in an upright position, as shown in FIG. 5, or at an angle of 45°, or at an inverted orientation, or at a 45° location with respect to the inverted position, and finally at a 90° orientation with respect to that shown in FIG. 5. By way of summary, it is noted that FIG. 1 shows the bulkheads 14, 14 oriented at these five different positions in a single twister section of a typical bottle rinser machine. In FIG. 1, for example, the container would arrive at the left-hand side of a twister in its inverted position, after having passed through the rinser and drying section of such a machine, and would then follow a helical motion wherein the container would emerge from the right-hand end of the twister shown in FIG. 1 in its upright position.

Still with reference to the typical bulkhead section shown in FIG. 5, a plurality of guide rod mounting devices are shown supported from the bulkhead 14, and one of these devices is shown broken away in the lower left-hand corner of the bulkhead shown in FIG. 5 to reveal the hexagonal opening 22 used to receive a unique correspondingly shaped soft plastic plug 24, which plug serves to support the guide rod in a predetermined angular relationship with respect to the bulkhead 14 to define a generally helical path of motion for the containers as they are fed through the twister.

FIG. 2 shows a bulkhead 14 with the side edge of the container opening 16 as indicated, and one hexagonal opening 22 with a relatively soft hexagonal plug 24 mounted adjacent the container opening 16 for supporting a guide rod 26. As shown in FIG. 1, this guide rod 26 is only one of several such guide rods provided in a typical twister section, and the guide rod supporting device to be described represents only one of a plurality of such devices associated with each of the five bulkheads in the single twister section shown in FIG. 1. The pattern of hexagonal holes in the bulkheads 14, 14 is so arranged as to provide the guide rods, 26 through 38 inclusively, just inside the outer marginal edges of the container opening 16. Therefore, the hexagonal openings are arranged in a predetermined pattern with respect to the container opening 16 and each of said openings has a hexagonal contour for receiving a hexagonal plug 24. The plug 24 has a central opening or axial bore 48 for loosely receiving a screw 46 to be described.

FIG. 2 shows a typical guide rod mounting device as including not only the relatively soft plastic plug 24, but also as including a rigid member, which may also be of plastic or other suitable material, as shown generally at 40. The rigid member 40 includes a laterally extending opening or cavity 42, which is adapted to slidably support the guide rod 26 so as to prevent it from movement toward and away from the direction of motion of the containers as they are fed through the container opening 16. The cavity 42 will be seen to support the rod 26 in normal relation to itself. The rigid member 40 includes a second lateral opening 44, which is adapted to receive a conventional screw 46. The screw 46 is also received in the axial bore 48 provided for this purpose in the soft plastic plug 24, and when assembled as shown in FIG. 3 a nut 50 can be threadably received on the end of the screw 46 to permit the soft plastic plug part 24 to be clamped axially and to be deformed between the ribbed face of the rigid member and the nut 50. It should also be noted that the head 48 of the screw 46 is adapted to seat in a non-circular opening 49 provided for this purpose in the rigid member 40. This permits the device to be conveniently assembled with one wrench for the nut 50, and allows the guide rod 26 to be held at the desired compound angle while the nut is so tightened.

Thus, the plastic plug 24 will be expanded radially in its associated hexagonal opening 22 in the bulkhead 14 thereby anchoring the device in a predetermined angular position with respect to the plane of the bulkhead 14. This angular relationship may of course be normal to the plane of the bulkhead 14 or may be such as to hold the rod in a predetermined position which is not normal to the bulkhead. The face of the rigid member 40 which engages the end of the plastic plug 24 is preferably provided with ribs 52, 52, which ribs embed themselves in the end of the relatively soft plastic plug 24 so as to preclude relative rotational movement between the plug 24 and the member 40 after these components have been assembled with one another as shown in FIG. 3. In a preferred construction the relatively soft plastic plug 24 has been fabricated successfully from polyethylene plastic, and the rigid member 40 from a styrene plastic of relatively rigid characteristics. The screw 46 and associated nut 50 are of conventional construction, and the guide rod is fabricated from a low friction plastic, preferably a graphite impregnated teflon material, so as to be self-lubricating and to facilitate sliding of the containers, such as glass bottles, as they are fed through the twister.

Finally, and with particular reference to FIG. 4, it will be apparent that the device of the present invention, although intended primarily for supporting the guide rod 26, can also be used to join two such guide rod segments in end-to-end relationship. The guide rod segments 26 and $26_a$ are so connected by utilizing a pair of rigid members 40, 40 mounted in tandem relationship so as to support the guide rods 26 and $26_a$ respectively in end-to-end relationship. In order to assure that these rigid members 40, 40 are properly aligned with one another, and that the guide rods 26 and $26_a$ are also aligned during assembly, a line up pin 60 is preferably inserted in aligned openings drilled in the members 40, 40. The two tandem members 40, 40 are assembled to a single soft plastic plug 24 and associated screw (not shown), which screw is slightly longer in length than the screw 46 shown in FIGS. 2 and 3, and with a similar nut 50 as shown. Thus, the guide rod mounting device described above has the added advantage of being capable of supporting a pair of guide rods 26, $26_a$ in end-to-end relationship merely by utilizing a slightly longer screw and by providing a pair of rigid members 40, 40 in place of a single member as shown in FIGS. 2 and 3.

As so constructed and arranged the guide rod mounting devices of the present invention are well suited for use in supporting the helically twisted guide rods of a container twister of the type used to invert and then to erect containers such as glass bottles in a rinser or the like.

We claim:

1. In a container rinser of the type which is adapted to receive containers in line and to twist them through a substantial angle as they are fed by line pressure through the rinser, the improvement comprising a plurality of longitudinally spaced bulkheads each of which has a container opening through which the containers are adapted to pass, each of said bulkheads also having a pattern of non-circular holes adjacent said container opening, frame means for supporting said bulkheads so that said container openings are oriented at predetermined positions with respect to one another, a plurality of container engaging guide rods extending through said container openings and located in inwardly spaced relation to said non-circular holes in said bulkheads, said guide rods being made from a resilient material and each rod being twisted in a helical fashion to engage a particular portion of the containers being fed through the twister, means for so supporting said guide rods including a non-circular plug of deformable plastic material received in each of said non-circular bulkhead holes, said guide rod supporting means further including a member which grips said guide rod, and means carried by said member for clamping said plug axially in said non-circular bulkhead hole to cause portions of said plug to expand radially beyond the confines of said non-circular bulkhead hole whereby said guide rod gripping member can be assembled to said bulkhead at a predetermined angle with respect thereto.

2. The combination defined in claim 1 wherein said rigid member which grips said guide rod being from a rigid plastic material and with an inner end defining lateral cavity for supporting said guide rod in normal relation thereto, and a second lateral opening adjacent an outer end, said means for clamping said plug comprising a screw in said second lateral opening, said screw extending through said second lateral opening and through a central opening in said plug, and a nut threadably received on said screw for clamping said plug to said rigid member.

3. The combination defined in claim 2 wherein said rigid plastic member has a plug engaging face which defines a series of grooves for engaging one end of said plug to deform said plug when said screw clamps said plug in said non-circular hole to preclude relative rotational movement between said plug and said rigid plastic member.

4. The combination defined in claim 3 wherein said guide rods are circular in cross section, and wherein said rods are made from a resilient self-lubricating material, and said lateral cavity in said rigid member for slidably receiving said rod also having a circular shape to conform to said circular rod cross section, said circular shape extending through more than 180° but less than 360° to expose said guide rod for engagement with the containers as aforesaid.

5. The combination defined in claim 4 wherein said non-circular plug has a cross section of polygonal shape which permits said plug to be loosely received in said non-circular bulkhead holes, said holes having a corresponding polygonal contour with sides against which the flat surfaces of said plug abut as the plug is clamped axially.

6. The combination defined in claim 5 wherein said plug is of hexagonal cross section and is made from a polyethylene plastic material so as to be readily deformed radially when clamped axially.

* * * * *